United States Patent
Yakuwa

(10) Patent No.: US 10,990,414 B2
(45) Date of Patent: Apr. 27, 2021

(54) SYSTEM CONSTRUCTION ASSISTANCE SYSTEM, INFORMATION PROCESSING DEVICE, METHOD AND STORAGE MEDIUM FOR STORING PROGRAM

(71) Applicant: NEC CORPORATION, Tokyo (JP)

(72) Inventor: Yutaka Yakuwa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 364 days.

(21) Appl. No.: 15/778,744

(22) PCT Filed: Nov. 17, 2016

(86) PCT No.: PCT/JP2016/084112
§ 371 (c)(1),
(2) Date: May 24, 2018

(87) PCT Pub. No.: WO2017/090506
PCT Pub. Date: Jun. 1, 2017

(65) Prior Publication Data
US 2018/0357075 A1   Dec. 13, 2018

(30) Foreign Application Priority Data
Nov. 27, 2015   (JP) .............................. JP2015-231333

(51) Int. Cl.
*G06F 9/44* (2018.01)
*G06F 9/445* (2018.01)
(Continued)

(52) U.S. Cl.
CPC ............ *G06F 9/44505* (2013.01); *G06F 8/20* (2013.01); *G06F 8/35* (2013.01); *G06F 9/3838* (2013.01);
(Continued)

(58) Field of Classification Search
CPC . G06F 8/20; G06F 8/30; G06F 13/124; G05B 19/045
See application file for complete search history.

(56) References Cited

U.S. PATENT DOCUMENTS

| 8,407,077 B2 * | 3/2013 | Hindi .................... G06Q 10/04 705/7.27 |
| 2015/0323916 A1 | 11/2015 | Kuroda et al. |
| 2015/0324211 A1 * | 11/2015 | Kuroda .................. G05B 15/02 713/100 |

FOREIGN PATENT DOCUMENTS

| JP | 2015-153275 A | 8/2015 |
| WO | 2013/128838 A1 | 9/2013 |

OTHER PUBLICATIONS

Takayuki Kuroda et al., "Model-based IT Change Management for Large System Definitions with State-related Dependencies", IEEE, Proc. of EDOC 2014, pp. 170-179.

(Continued)

*Primary Examiner* — Duy Khuong T Nguyen

(57) ABSTRACT

The purpose of the present invention is to more assuredly generate a system construction procedure, while reducing the amount of calculation. This system construction assistance system is provided with: a state model dividing unit 501 that divides state models into one or more groups, on the basis of at least the dependency between state elements included in the state models; a invertibility determination unit 502 that determines the invertibility of a set of state elements belonging to a specified group; a group dependent procedure calculation unit 503 that calculates, for each group after division, a procedure for transitioning the set of state elements belonging to the group to a requested state; and a procedure integration unit 504 that integrates the procedures calculated for each group.

12 Claims, 16 Drawing Sheets

(51) Int. Cl.
    *G06F 9/48*         (2006.01)
    *G06F 8/20*         (2018.01)
    *G06F 8/35*         (2018.01)
    *G06F 9/448*       (2018.01)
    *G06F 9/38*         (2018.01)
    *G06F 9/4401*     (2018.01)

(52) U.S. Cl.
    CPC ................ *G06F 9/44* (2013.01); *G06F 9/445* (2013.01); *G06F 9/4406* (2013.01); *G06F 9/4498* (2018.02); *G06F 9/48* (2013.01)

(56) References Cited

OTHER PUBLICATIONS

Written Opinion for PCT/JP2016/084112, dated Feb. 14, 2017.
International Search Report for PCT/JP2016/084112, dated Feb. 14, 2017.

* cited by examiner

SYSTEM CONSTRUCTION ASSISTANCE SYSTEM, INFORMATION PROCESSING DEVICE, METHOD AND STORAGE MEDIUM FOR STORING PROGRAM

CROSS REFERENCE TO RELATED APPLICATIONS

This application is a National Stage of International Application No. PCT/JP2016/084112 filed Nov. 17, 2016, claiming priority based on Japanese Patent Application No. 2015-231333 filed Nov. 27, 2015, the disclosure of which is incorporated herein in its entirety.

TECHNICAL FIELD

The present invention relates to a system construction assistance system, an information processing device, a system construction support method, and a system construction support program for supporting construction of a system.

BACKGROUND ART

In general, construction and a change of a system is performed by an administrator of the system who create a procedure manual for making components included in the system be in a state as requested and by a worker who executes work according to the procedure manual. In general, so-called construction of system means causing each of the components to transition from an initial state to a required state. So called system change means causing each of the components to transition from a current state to a required state. However, they are different only in the state from which they transit, which is any one of many states or an initial state, and therefore, in the present specification, both are referred to as "construction of the system" that includes both of them. That is, in this specification, the construction of the system means causing the system to transition from any one of many states to a required state. In the following, elements included in a system may be referred to as constituent elements or components of the system.

In order to complete the construction work correctly, the construction work needs to be executed in correct order. Ordering of construction work varies depending on the characteristics and combination of constituent elements of a system. Therefore, in order to correctly generate the procedure manual, it is necessary to have a deep understanding of the targeted system and its components, requiring a high level of expertise and enormous time.

To solve such a problem, there is a technique of representing a component formally on the basis of a requirement concerning a construction procedure and generating a construction procedure automatically from the requirement. For example, NPL 1 describes calculating difference between a current state of a system and a post-construction state of the system on the basis of information in which the post-construction state of the system (i.e. required state of each component) is declaratively described as a model and generating a construction procedure automatically.

CITATION LIST

Non Patent Literature

[NPL 1] Kuroda, T. et al., "Model-based IT Change Management for Large System Definitions with State-related Dependencies", Proc. of EDAC 2014, 2014.

SUMMARY OF INVENTION

Technical Problem

The construction procedure generation method described in NPL 1 roughly includes four processes, i.e., simplification of a state model, division of the state model, calculation of construction procedure, and integration of the construction procedures. Before explaining the contents of the processing, the state model described in NPL 1 is explained.

The state model is one of methods of declaratively describing a state of a system as a model. More specifically, the state model is a data model representing information necessary for calculation of a construction procedure of a system, and includes information indicating state elements and information indicating dependency between state elements. Here a state element is a constituent element, in the system, having independent state, and is the smallest constituent unit that is considered while calculating a procedure. The state element is defined by a plurality of exclusive states and state transitions therebetween. The state is literally a state that the system can take. It is possible to define as many states as they are required. A state element includes always one current state and an appropriate number of required states. In addition, the "state transition" represents a state from which a state element can change and a state to which the state element can change, and can be defined between any states in the same state element. The dependency is defined for a state transition (i.e. a first state transition) in a state element (i.e. a first state element) with respect to a state in another state element (i.e. a second state element), and represents a condition that the second state element have to be in a specified state in order for the first state element to perform the first state transition.

FIG. 11 is an explanatory diagram showing an example of the state model defined for the Tomcat package and Ubuntu Virtual Machine (VM). The "Tomcat" state element shown in FIG. 11 is assumed to be a state element that defines a state of a component corresponding to "Tomcat" which is a kind of web container. The "Ubuntu" state element is assumed to be a state element that defines a state of a component corresponding to "Ubuntu" which is a kind of operating system (OS) running on the virtual machine (VM). As shown in FIG. 11, a state element is represented by a rectangle. A state is represented by an ellipse. A current state is represented by a double-line ellipse. A required state is represented by a solid ellipse. The state transition is represented by an arrow drawn by a solid line. The dependency is represented by an arrow drawn by a broken line. An arrow of dependency indicates a subject side of dependency by a starting point, and indicates an object side of dependency by an ending point. In the definition for each state element in the example shown in FIG. 11, "f" represents a current state (for example, a state in which installation is not performed), and "t" represents a required state (for example, a state in which installation has been performed).

In FIG. 11, the dependency is displayed as an arrow from a state element to a state in another state element, and indicates, in this case, that all the state transitions in the state element at the starting point of the arrow depend on the state pointed by the ending point of the arrow.

In addition, a type and Identification (ID) of a state element are put close to an outer frame of a rectangle representing the state element. A name of the type is put in the left side of ":" and the ID is put in the right side of ":". The type of the state element may be omitted. In the following description, a case in which a state element includes a state transition that depends on a state in another state element may be expressed by using the state elements: for example, "the former state element depends on the latter state element" or "the former state element has a dependency on the latter state element".

Next, the four pieces of processing included in the construction procedure generation method described in NPL 1 is briefly described as follows. Simplification processing of a state model is processing that removes from the state model the dependency associated with a component that is obviously not changed. Here, in the present specification, a state referred to as "required state in a broad sense" is a certain state satisfying a condition that the certain state is specified as a current state or a required state of the state element thereof or a condition that a transition of in another state element depends on the certain state. An example of simplification of the state model is processing of eliminating a certain state element from a state model to exclude the certain state element from a target of construction procedure calculation when the current state of the certain state element is a required state. This is because making transition is considered not to be necessary in the certain state element. In addition, dependency related to the certain state element may be further removed from the state model. In a state element, transition to other than a request state in a broad sense and dependency related with the transition may be removed from a state element. This is because making transition to a required state in a broad sense is considered to be necessary, but making other transitions is considered not to be necessary.

Division processing of a state model is processing of dividing the state model into parts each of which is expected to be necessarily collectively used for consideration and calculation when calculation of a construction procedure is performed. An example of division of a state model is processing of dividing state elements in the same state model so as that the state elements belong to different groups if there is no dependency relationship between the state elements. Here, the groups generated by the dividing correspond, respectively, to the parts each of which is expected to be necessarily collectively used for consideration and calculation. NPL 1 assumes that dividing may be performed in the same way even when there is a dependency between state elements, if it is a one-way dependency.

FIG. 12 is an explanatory diagram showing an example of division of a state model. The part (a) of FIG. 12 shows an example of a state model, and the part (b) of FIG. 12 shows a division example of the state model. When there is a mutual dependency, e.g., dependency between "T.pkg" and "T.svc", i.e. when there is a circularity in the dependency, related state elements are grouped into the same group, and otherwise, state elements are divided into different groups. The part (c) of FIG. 12 shows an example of a procedure generation method performed after division of the state model, and the part (d) of FIG. 12 shows an example of the procedure generated by the method.

The part (a) of FIG. 12 shows as an example of a state model a model including four state elements ("J.pkg", "J.svc", "T.pkg", and "T.svc"). In this example, the state element "J.svc" has dependency on the state element "J.pkg". The state element "T pkg" depends on the state element "T.svc". The state element "T.svc" depends on the state element "T.pkg". In the case of this example, dividing is determined to be possible between the state elements that have no relation of dependency, for example, from "J.pkg" to "T.pkg" and to "T.svc", those opposite thereto, from "J.svc" to "T.pkg" and to "T.svc", those opposite thereto, and the like (see the relationship between g1 and g3, the relationship between g2 and g3 and the like in the part (b) of FIG. 12). The state element "J.svc" has dependency on the state element "J.pkg", but since the direction of the dependency is one way, dividing the state elements "J.svc" and "J.pkg" are determined to be possible (see the relationship between g1 and g2 in the part (b) of FIG. 12). On the other hand, because the state elements "T.pkg" and "T.svc" have dependency on each other, and there is a circularity in the dependency, division is determined to be impossible. Therefore, the state elements "T.pkg" and "T.svc" are determined to be in the same group (see g3 in the part (b) of FIG. 12).

In calculation processing of a construction procedure, procedure calculation is performed separately for each group generated by division processing of a state model as described above. When there is, for a certain group, another group including a state element that depends on a state element in the certain group, the procedure calculation of the certain group is performed after the procedure calculation of the concerning another group is completed. For example, when performing a procedure calculation of a certain group g, a provisional state element into which state transitions having dependencies is grouped is generated for each of the other groups including state elements each of which depends on any state element in the group g. In this case, the provisional state element is generated by appropriately connecting provisional states so that the state transitions having dependencies satisfy order obtained by the procedure calculation so far. Then, assuming that the a combination of the generated provisional state element and the state element included in the group g is a constraint on procedure calculation, procedure for the group g is calculated by a method such as Automated Planning.

In integration processing of construction procedures, procedures of groups and order relation between the procedures of the groups are known by the calculation processing of the construction procedure described above. The procedures of the groups are integrated so that the order relation between the procedures of the groups is not broken. As a result, the construction procedure of the entire system is generated.

In the method described in NPL 1, the calculation amount required for procedure generation for the entire system is reduced by calculating the procedure by dividing the state model of the target system into as small groups of state elements as possible on the basis of the dependency between state elements included in the state model.

However, in the method described in NPL 1, as a result of division of the state model, a procedure that really exists may be erroneously determined not to exist. In other words, there is a problem that the method described in NPL 1 is not necessarily able to find a construction procedure under a specific condition.

A specific example in which a construction procedure is not able be found by the technique disclosed in NPL 1 is described with reference to FIG. 13 to FIG. 15. The state model shown in FIG. 13 is a case that meets the specific condition described above. In the state model shown in FIG. 13, a transition from a state "f" to a state "u" in a state element "A" depends on a state "t" of a state element "B". A transition from the state "f" to the state "t" in the state element "A" depends on the state "u" of the state element "B". In both of the state elements A and B, the current states are "f", and it is necessary to derive the procedure to cause both of them to become the required states "t". Here, if a person thinks of this procedure with his or her brain, he or she can understand that it may be preferable to cause the state element "B" to transition from the state "f" to the state "t" first, to cause the state element "A" to transition from the state "f" to the state "u" next, and to cause the state element "A" to transition from the state "u" to the state "t" finally.

Next, an example of generating a construction procedure according to the method described in NPL 1 is described below. In the method described in NPL 1, a system that performs procedure generation first simplifies a state model. Simplification of a state model is aimed at reducing a calculation amount of the whole processing, and the goal that is generation of a construction procedure can be achieved without simplification. In addition, the method of the present invention, which is described later, does not contribute to simplification and is not influenced by whether simplification is performed or not. Therefore, hereinafter, explanation is made on the assumption that no simplification is performed.

Next, the system divides the state model. In the case of the state model shown in FIG. 13, although there is a dependency from the state element "A" to the state element "B", the state element "B" does not depend on the state element "A" and that is a one way dependency. Therefore, the system divides the state element "A" and the state element "B" into different groups. As a result, the state model shown in FIG. 13 is divided in such a manner that the state element "A" is included in a group g1 and the state element "B" is included in a group g2 as shown in FIG. 14.

Next, the system performs procedure calculation for each of the groups generated by dividing the state model. At that time, when a group includes a state element that depends on a state element included in another group, the system performs the procedure calculation for the group after completion of the calculation of the concerning another group. In the case of the example shown in FIG. 14, the group g1 does not include a state element on which a state element of another group depends. On the other hand, the group g2 includes the state element "B" on which the state element "A" of the group g1 depends. Therefore, the system performs procedure calculation for the group g1 first. In the method described in NPL1, dependency on a state element included in another group is disregarded when the procedure calculation is performed for each group.

Here, in the calculation processing of the construction procedure of the group "g1", procedures that can be generated is two types of procedures, i.e., a procedure of causing the state element "A" to transition from the state "f" to the state "t" directly, and a procedure for causing the state element "A" to transition from state "f" to state "u" and then to transition to the state "t". The method of procedure calculation determines which is generated, but in this example, the former procedure whose number of transitions is smaller is assumed to be generated. When the procedure calculation for the group g1 is completed, there is no other group including a state element that depends on a state element in the group g2, and the procedure calculation for the group g2 becomes possible. When calculating the construction procedure for the group g2, the system generates a provisional state element of the state element "A" that is in another group and depends on the state element "B" included in the group. In addition, the system performs procedure calculation on the assumption that the generated provisional state element is included in the group g2.

Here, the provisional state element of the state element A includes only a state and a transition included in the procedure generated as a result of the procedure calculation for the group g1. FIG. 15 shows an example of the provisional state element generated by the method described above. FIG. 15 shows a provisional state element "A" of the state element "A" included in the group g1. By the way, it can be seen that, for the group g2 including the provisional state element "A" as shown in FIG. 15, there is no procedure that is capable of causing all the state elements to transition to the required state. For this reason, the system returns a processing result indicating that there is no procedure for causing all the state elements of the state model shown in FIG. 13 to transition to the required state.

However, as mentioned above, there is actually a procedure that causes all the state elements of the state model shown in FIG. 13 to transition to the required state, and the processing result described above is erroneous. Thus, in the method described in NPL 1, there is a problem that generation of a construction procedure fails in a specific case.

A supplemental description with respect to the above example is that, the problem described above is not caused if a procedure that causes the state element A to transition from the state "f" to the state "u" and then to the state "t" is generated when the procedure calculation of the group g1 is performed. However, when multiple procedure candidates exist, which one is generated depends on the method of procedure calculation determines which is generated when there is a plurality of procedures, and the method described in NPL 1 none the less has potentially a risk in failing to generate the construction procedure in a specific case.

Therefore, in view of the problem described above, the present invention provides a system construction assistance system, an information processing device, a system construction support method, and a system construction support program that are capable of more reliably generating a construction procedure of a system while suppressing a calculation amount.

Solution to Problem

A system construction assistance system according to an aspect of the present invention comprises: state model dividing means for dividing a state model into one or more groups on a basis of at least dependency between state elements included in the state model; invertibility determination means for determining invertibility of state elements belonging to a specified group; group dependent procedure calculation means for calculating, separately for each of the groups generated by dividing, a procedure for causing the state elements belonging to a group to transition to a required state; and procedure integration means for integrating the procedure calculated for each of the groups.

An information processing device according to an aspect of the present invention comprises: state model dividing means for dividing a state model into one or more groups on a basis of at least dependency between state elements included in a state model; invertibility determination means for determining invertibility of state elements belonging to a specified group; and regroup means for regrouping the groups on a basis of a result of determining the invertibility.

A system construction support method according to an aspect of the present invention is performed by an information processing device, the method comprising: dividing a state model into one or more groups on a basis of dependency between state elements included in the state model and invertibility of the state elements belonging to the groups generated by dividing; calculating, separately for each of the groups generated by dividing, a procedure for causing the state elements belonging to a group to transition to a required state; and integrate the procedure calculated for each of the groups.

A system construction support method according to an aspect of the present invention is performed by an information processing device, the method comprising: dividing a state model into one or more groups on a basis of dependency between state elements included in the state model; calculating, separately for each of the groups generated by dividing, a procedure for causing the state elements belonging to a group to transition to a required state; regrouping, when there is a group for which a valid procedure is not calculated as a result of the calculation of the procedure, the groups on a basis of invertibility of the state elements belonging to the group; calculating, for each of the groups generated by the regrouping, a procedure for causing the state elements belonging to a group to transition to a required state; and integrating the procedure calculated for each of the groups generated by the regrouping.

A storage medium according to an aspect of the present invention stores a system construction support program for causing a computer to execute: state model division processing of dividing a state model into one or more groups on a basis of at least dependency between state elements included in the state model; invertibility determination processing of determining invertibility of state elements belonging to a specified group; group dependent procedure calculation processing of calculating, separately for each of the groups generated by dividing, a procedure for causing the state elements belonging to a group to transition to a required state; and procedure integration processing of integrating the procedure calculated for each of the groups.

A storage medium according to an aspect of the present invention stores a system construction support program for causing a computer to execute: state model division processing of dividing the state model into one or more groups on a basis of at least dependency between state elements included in the state model; invertibility determination processing of determining invertibility of state elements belonging to a specified group; and regroup processing of regrouping the groups on a basis of a result of determining the invertibility.

A system construction support method according to an aspect of the present invention comprises: dividing a state model into one or more groups on the basis of at least dependency between state elements included in the state model; determining invertibility of state elements belonging to a specified group; calculating, separately for each of the groups generated by dividing, a procedure for causing the state elements belonging to a group to transition to a required state; and integrating the procedure calculated for each of the groups.

An information processing method according to an aspect of the present invention comprises: dividing a state model into one or more groups on a basis of at least dependency between state elements included in the state model; determining invertibility of state elements belonging to a specified group; and regrouping the groups on a basis of a result of determining the invertibility.

Advantageous Effects of Invention

According to the present invention, a system construction assistance system, an information processing device, a system construction support method, and a system construction support program that are capable of more reliably generating a construction procedure of a system while suppressing a calculation amount is able to be provided.

DESCRIPTION OF EMBODIMENTS

Hereinafter, an example embodiment of the present invention is described with reference to the drawings. Before that, a success condition which is a condition under which the method described in NPL 1 succeeds in generation of a construction procedure is described. The following analysis has been given by the inventor of the present invention.

Assume that, when a state model is divided into one or more groups on the basis of dependency between state elements included in the state model, a partial state model, which is a state model generated by dividing, belonging to a certain group g includes a state element on which a state element of a partial state model belonging to another group depends. In this case, construction procedure generation succeeds when there always exists a transition path from any possible state that a partial state model belonging to the group g can take to any other state that the partial state model can take. Here, the state of group g, more specifically, the state of the partial state model belonging to group g, is represented by a direct product of the states of the state elements included in the partial state model. The transition path represents a sequence of one or more transitions.

The success condition described above is expressed in an intuitive manner as follows: the partial state model belonging to group g is always able to reach any state by a certain times of transitions. In this specification, a situation where a partial state model belonging to the group g satisfies this condition is expressed as: "the group g and state elements belonging to the group g are invertible". This property is referred to as "invertibility".

On the other hand, when the group g is not invertible, generation of a construction procedure may fail as in the example described above. In intuitively expressing the conditions that may fail, the group g includes another state which is not able to be reached from a certain state by any number of transitions.

Figure 14:
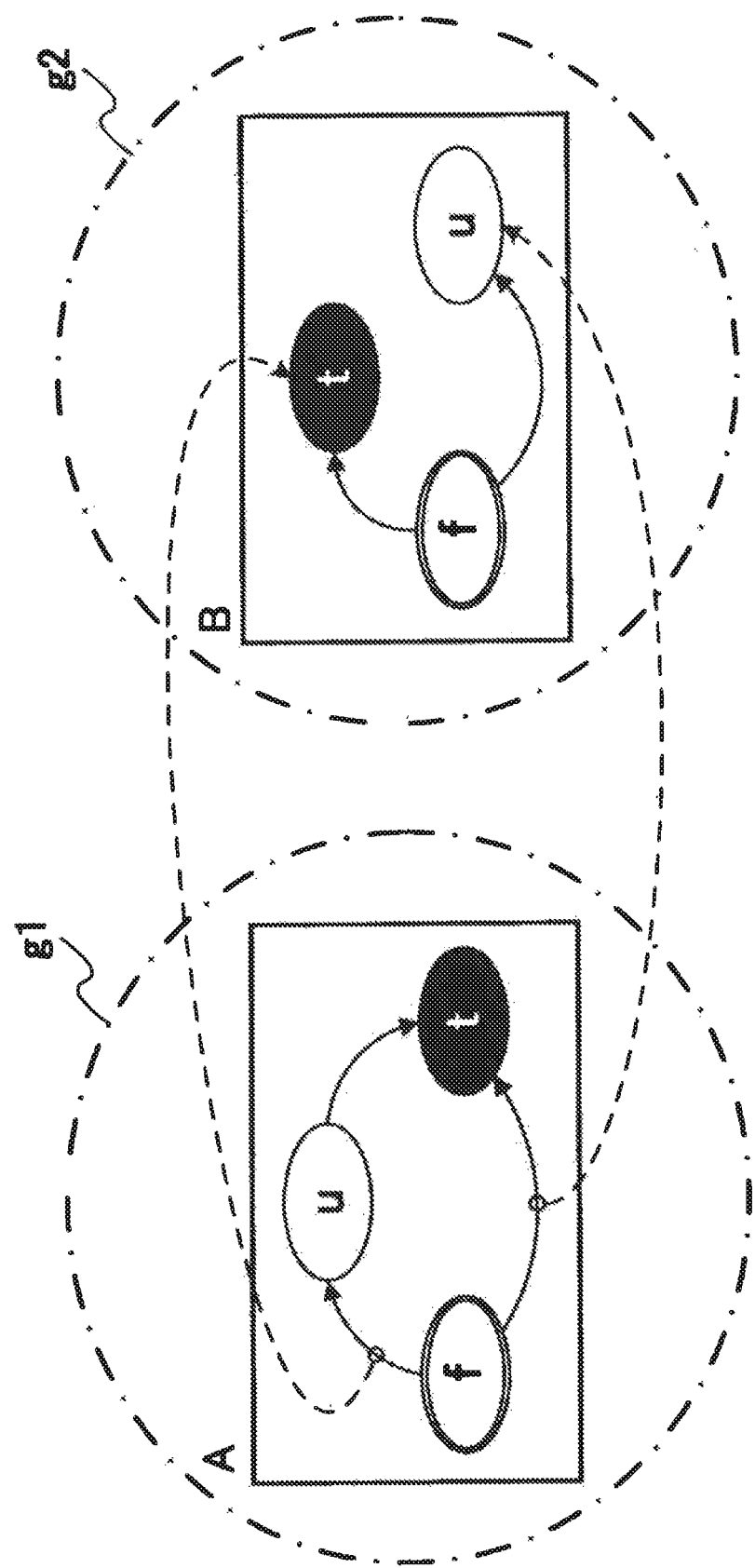
FIG. 14 is an explanatory diagram showing a division example of a state model.
Figure 15:
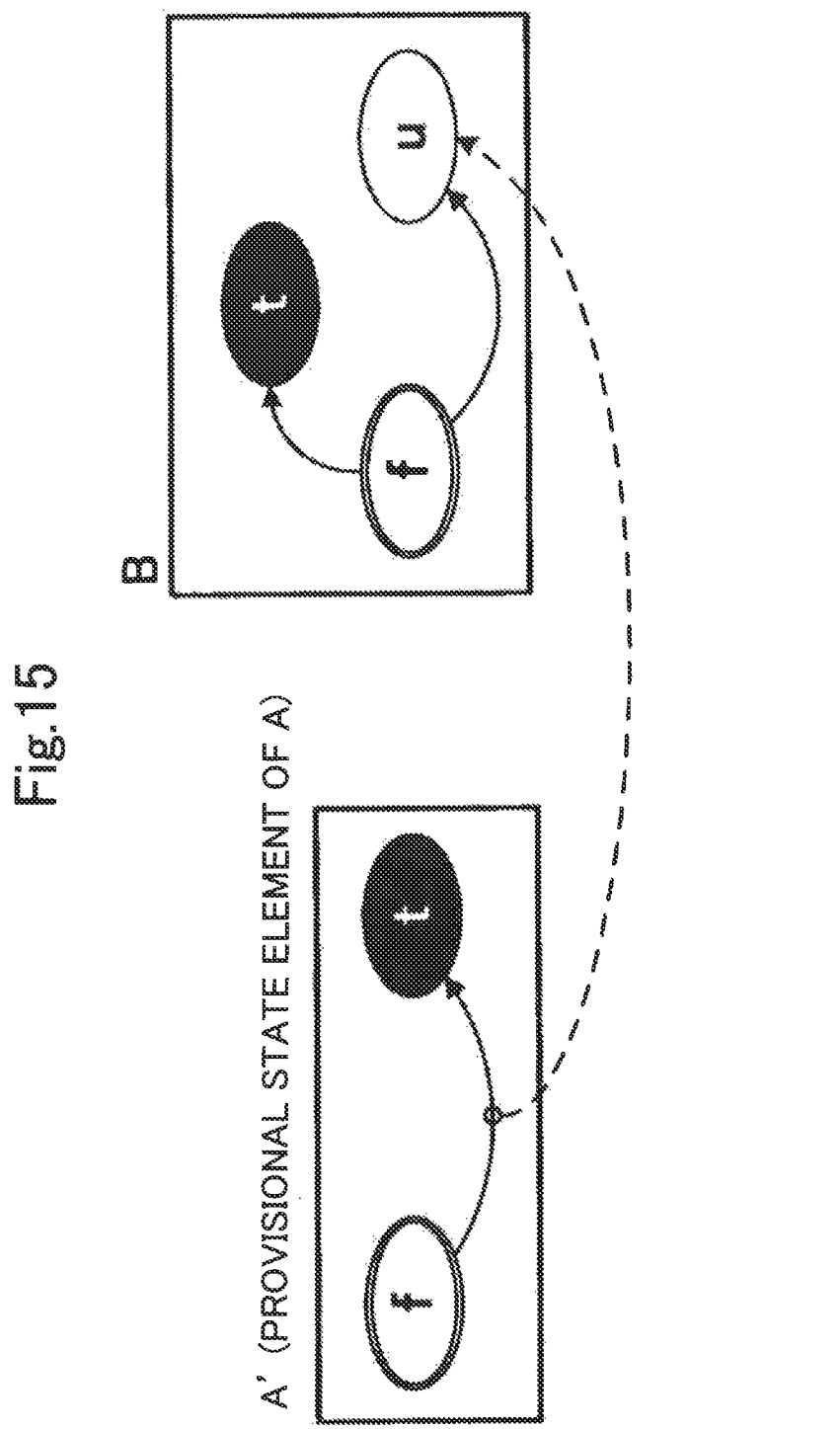
FIG. 15 is an explanatory diagram showing an example of a provisional state element.

For example, in the state model shown in FIG. 14, the group g2 is not invertible because the state element B of the group g2 is not able to transition from the state "u" to the state "t". Since this group g2 includes the state element B on which the state element A of the group g1 depends, there is a possibility that the generation of a construction procedure may fail, and an example of actually failing is as described above.

Therefore, to confirm that generation of a construction procedure does not fail by the method described in NPL 1, a point to be confirmed may be as follows. That is, the point to be confirmed may be that, when a state model is divided into one or more groups, all groups including state elements on each of which a state element in other group depends are invertible, in other words, the point to be confirmed may be that there is no group including a state element that depends on a state element of a group that is not invertible. When there is a group including a state element that depends on a state element of a group that is not invertible, the manner of division for groups may be changed so that there is no such group. In this way, it is possible to eliminate the possibility of failing in generation of a construction procedure due to division of a state model.

First Example Embodiment

Next, the first example embodiment of the present invention will be described with reference to the drawings.

[Explanation about Configuration]

Figure 1:
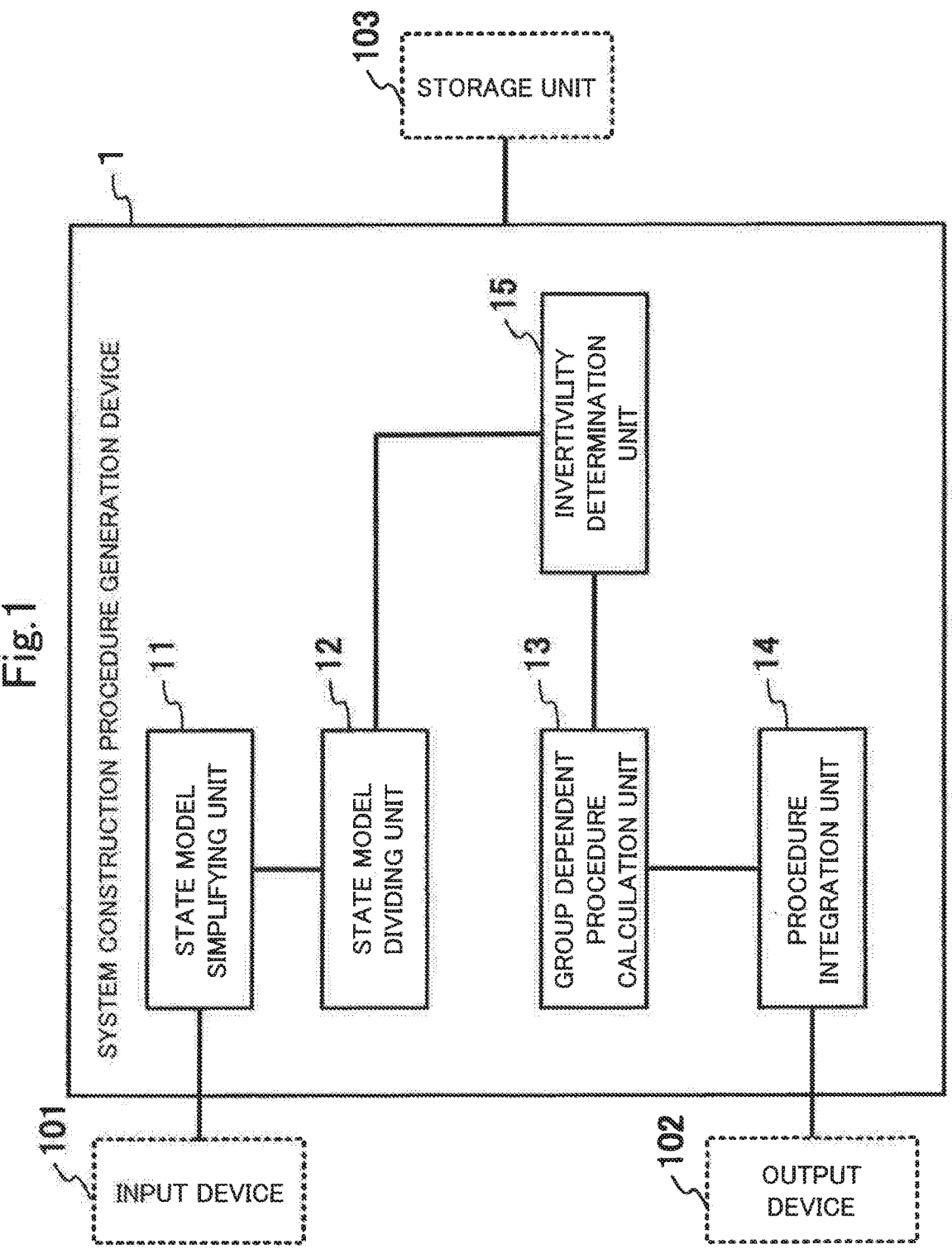
FIG. 1 is a block diagram showing a configuration example of a system construction procedure generation device according to a first example embodiment.

FIG. 1 is a block diagram showing a configuration example of a system construction procedure generation device according to the first example embodiment of the present invention. The system construction procedure generation device is an example of an information processing device of a system construction procedure support system according to the present invention. The system construction procedure generation device 1 as shown in FIG. 1 includes a state model simplifying unit 11, a state model dividing unit 12, an invertibility determination unit 15, a group dependent procedure calculation unit 13, and a procedure integration unit 14.

Each of these units generally operates as follows.

The state model simplifying unit 11 removes an element which is estimated to be unnecessary for construction from a state model of a system set as a construction target of construction of a procedure. Hereinafter, a system that is a target of construction of a procedure may be referred to simply as a target system.

When calculation of a construction procedure of a system is performed, the state model dividing unit 12 divides a state model into parts each of which is expected to be necessarily collectively used for consideration and calculation. Specifically, the "parts each of which is expected to be necessarily collectively used for consideration and calculation" means that, in a case where a state model is divided into groups, groups in which there does not exist any group including a state element that depends on a state element of a group that is not invertible. A state model is only necessarily divided into such groups finally, and a state model is not necessarily divided into such groups in the first division processing. The state model dividing unit 12 may first divide a state model on the basis of the dependency between the state elements as described in NPL 1.

The invertibility determination unit 15 determines invertibility of a partial state model belonging to each of the groups of the partial state model obtained as a result of the dividing by the state model dividing unit 12.

The group dependent procedure calculation unit 13 calculates a procedure for transitioning state elements belonging to a group to a required state independently for each of the groups of the partial state model obtained as a result of the dividing by the state model dividing unit 12.

The procedure integration unit 14 integrates procedures calculated for each group by the group dependent procedure calculation unit 13, and generates a construction procedure of the entire system.

The system construction procedure generation device 1 may be, for example, a computer such as a personal computer or a server device. An example shown in FIG. 1 represents an example in which an input device 101, an output device 102, and a storage unit 103 are connected to the system construction procedure generation device 1. However, those may be implemented in the system construction procedure generation device 1 itself. In the present example embodiment, the state model simplifying unit 11, the state model dividing unit 12, the invertibility determination unit 15, the group dependent procedure calculation unit 13 and the procedural unit 14 are achieved by, for example, a central processing unit (CPU) and the like, operating according to a program.

[Explanation about Operation]

Figure 2:
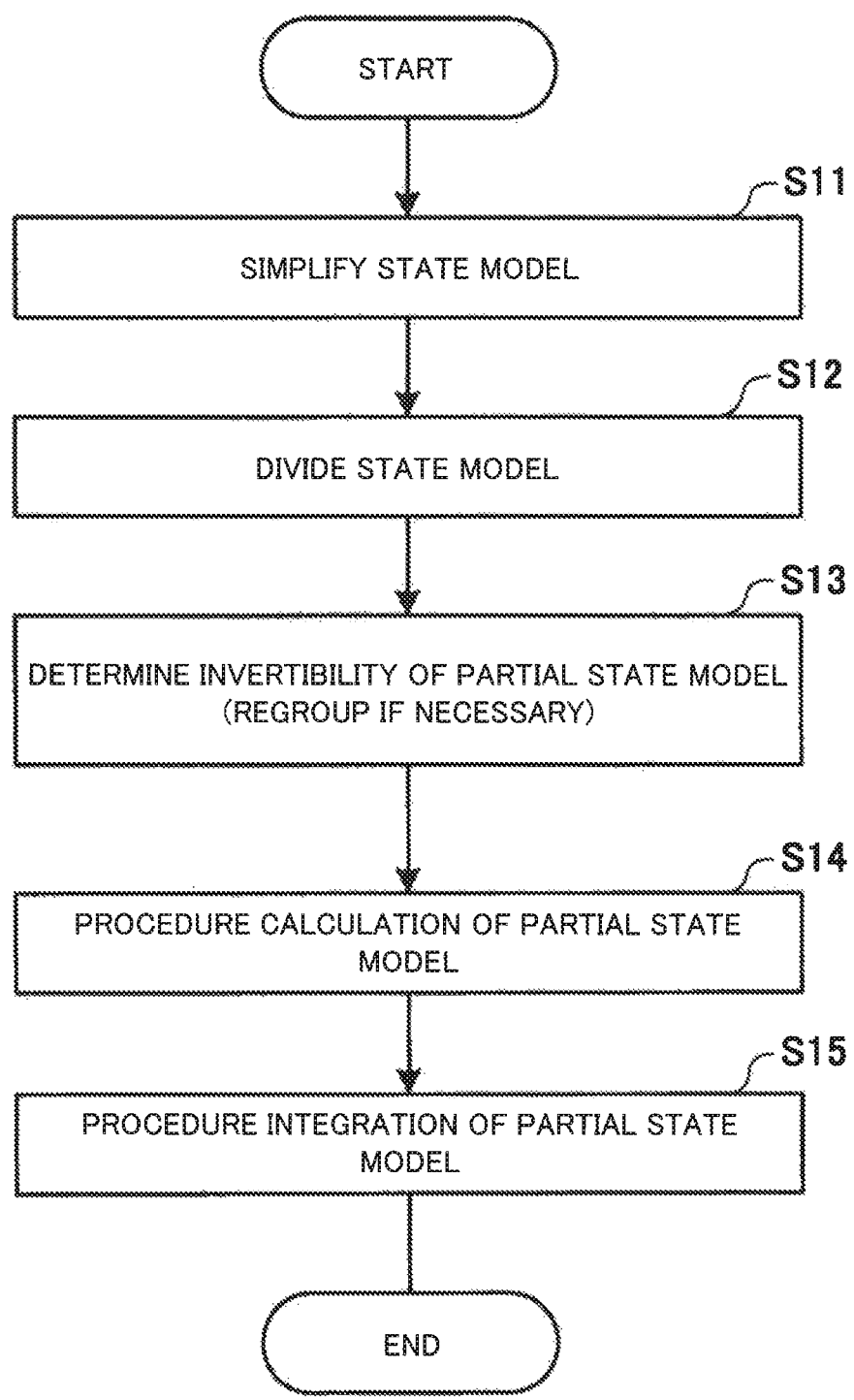
FIG. 2 is a flowchart showing an example of overall operation of the system construction procedure generation device according to the first example embodiment.

The operation of the present example embodiment is explained next. FIG. 2 is a flowchart showing an example of the overall operation of the system construction procedure generation device 1 according to the present example embodiment. In the example shown in FIG. 2, the state model simplifying unit 11 receives a state model of a target system as an input, and removes an element that is considered to be unnecessary for construction from the received state model (step S11). Hereinafter, the state model received here may be referred to as a state model M11, and the simplified state model may be referred to as a state model M12. In a case where it does not matter whether a state model is simplified or not, it may be referred to as a state model M12 even if it is not simplified.

Next, the state model dividing unit 12 divides the state model M12 into parts each of which is expected to be necessarily collectively used for consideration and calculation when a construction procedure is calculated (step S12).

Next, the invertibility determination unit 15 determines invertibility independently for partial state models each being groups generated as a result of dividing by the state model dividing unit 12 (step S13). On the basis of a result of determination in step S13, the state model dividing unit 12 redoes division (i.e. grouping) of the state model M12 as necessary.

Then, the group dependent procedure calculation unit 13 calculates a partial procedure in the system construction independently for each of the groups generated as a result of dividing by the state model dividing unit 12 (step S14).

Finally, the procedural integration unit 14 integrates procedures for the groups calculated by the group dependent procedure calculation unit 13, and generates a construction procedure for the entire system (step S15).

Figure 3:
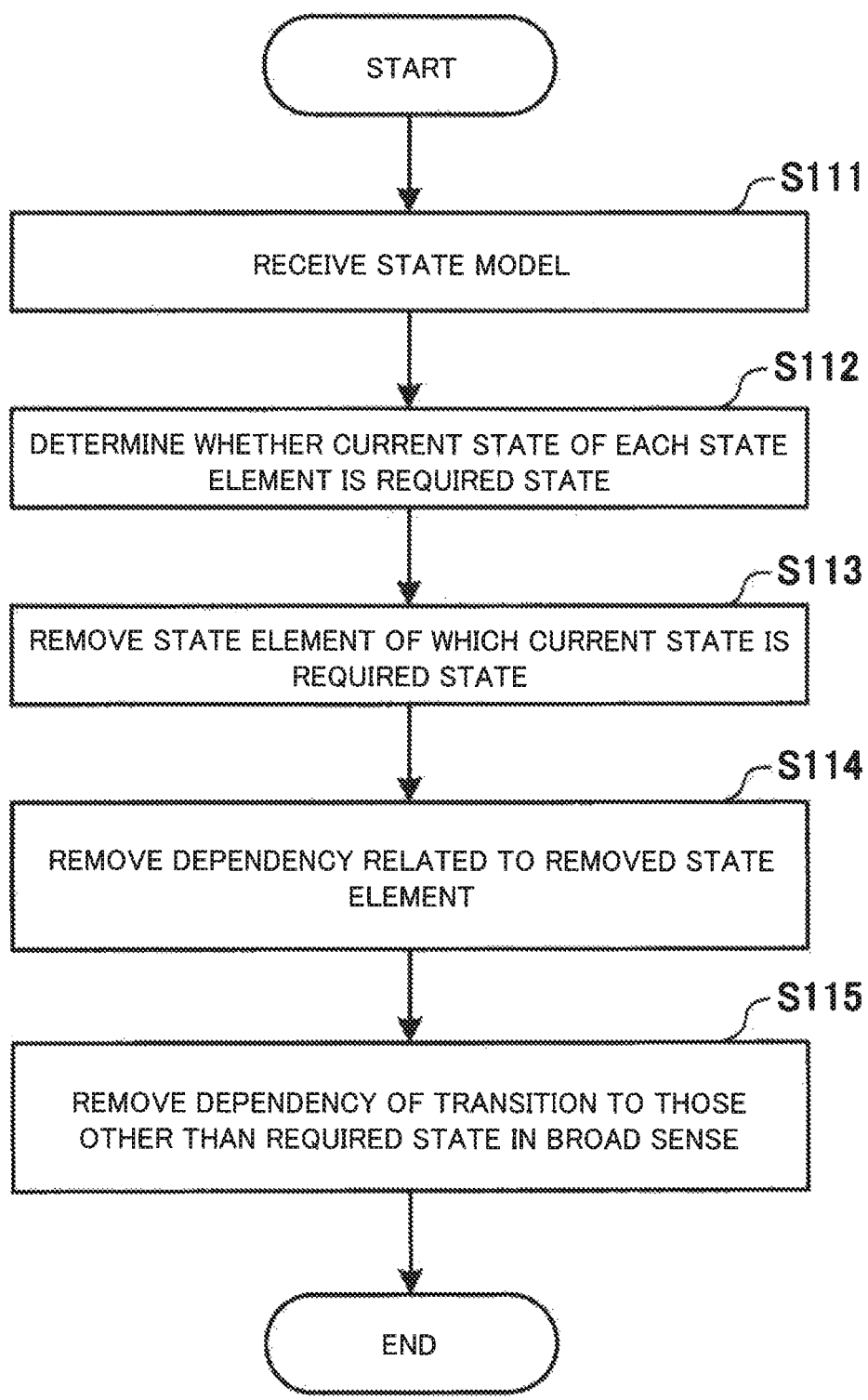
FIG. 3 is a flowchart showing an example of more detailed processing flow of state model simplification processing.

Next, the operation of step S11 in FIG. 2 will be explained in more detail with reference to FIG. 3. FIG. 3 is a flowchart showing an example of more detailed processing flow of simplifying processing of a state model shown as step S11 in FIG. 2. This simplifying processing of a state model is basically similar to the simplifying processing of a state model described in NPL 1.

In the example shown in FIG. 3, the state model simplifying unit 11 first receives a state model M11 of a target system as an input (step S111).

Next, the state model simplifying unit 11 determines whether the current state of the state element is a required state (step S112). When being the required state, the state element is removed from the state model as a non-target of construction procedure calculation (step S113), and the dependency related to the state element is also removed from the state model (step S114).

The state model simplifying unit 11 removes dependency that a transition other than a transition to the required state in a broad sense has (step S115).

By such an operation, a simplified state model M12 is generated.

Next, the operation of step S12 of FIG. 2 will be described in more detail. The division processing of a state model shown as step S12 in FIG. 2 may be basically similar to the division processing of a state model described in NPL 1. That is, the state model dividing unit 12 divides state elements in the simplified state model M12 into their separate groups except for a state element having dependency on another state element. In this case, even when state elements have dependency, the state model dividing unit 12 divides the state elements into their separate groups similarly if the dependency is one-way dependency. By such an operation, one or more groups (i.e. partial state models M13) are generated.

Figure 4:
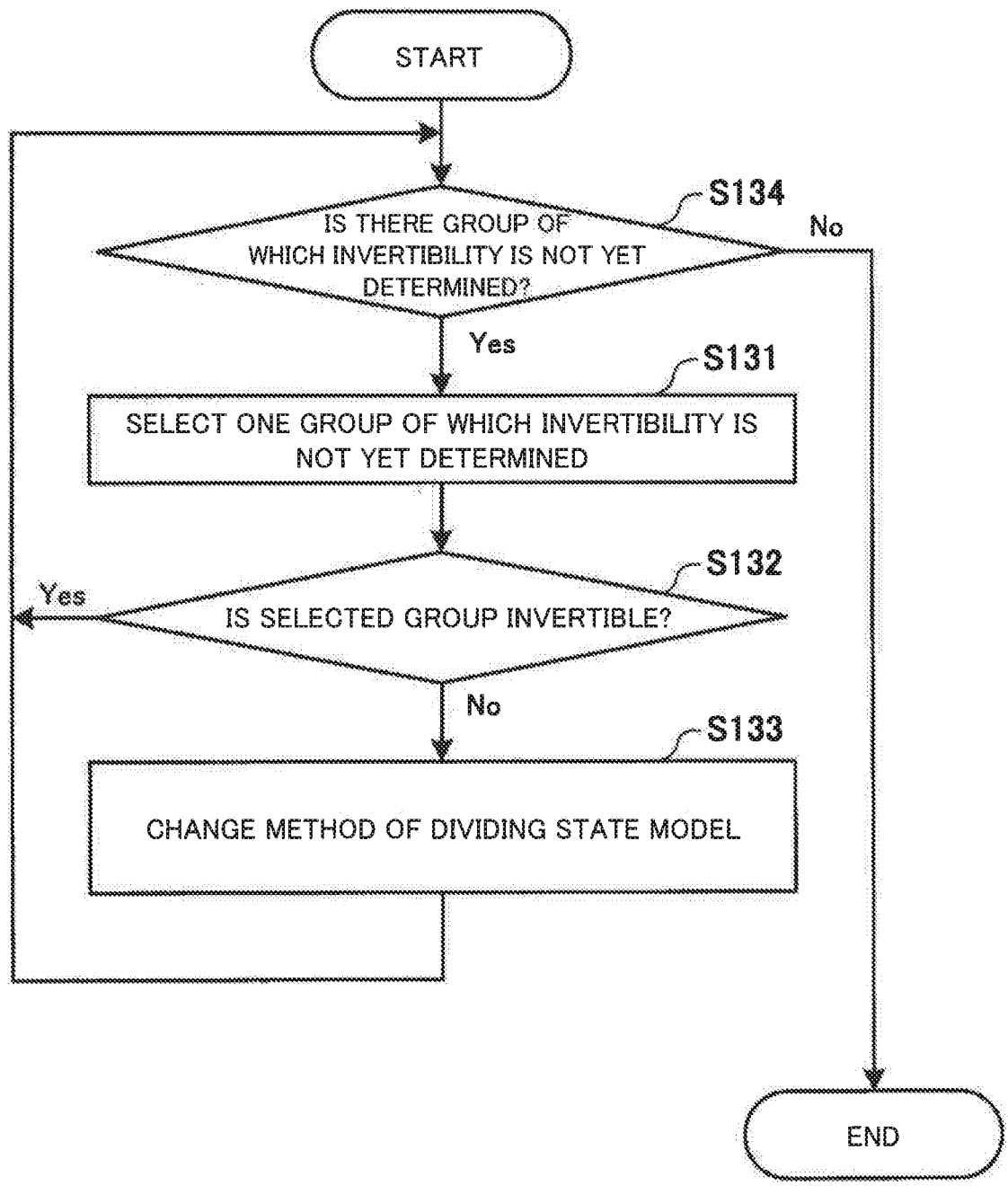
FIG. 4 is a flowchart showing an example of more detailed processing flow of invertibility determination processing.

Next, the operation of step S13 in FIG. 2 will be explained in more detail with reference to FIG. 4. FIG. 4 is a flowchart showing an example of more detailed processing flow of invertibility determination processing shown as step S13. In the example shown in FIG. 4, first, the invertibility determination unit 15 selects one group for which invertibility has not yet been determined from the groups generated by dividing (step S131). Hereinafter, the group selected in step S131 is referred to as a group g.

Then invertibility determination unit 15 determines invertibility of the group g (step S132). The determination method is not limited, but the invertibility determination unit 15 may make determination by generating a direct product automaton of all state elements included in the group g, for example, by assuming it as a graph and confirming strongly connected components.

As a result of the determination in step S132, when the group g is invertible, the invertibility determination unit 15 completes the invertibility determination of the group g and returns to step S131. On the other hand, when group g is not invertible, the invertibility determination unit 15 outputs a determination result or a request for regrouping to the state model dividing unit 12.

Subsequently, the state model dividing unit 12 changes the method of dividing the state model M12 in response to the determination result or the request for regrouping (step S133). The target of changing is the group g and all the groups each of which includes a state element depending on a state element of the group g. The state model dividing unit 12 that is a new group into which all the state elements included in the groups that are the target of changing are put together, and thereby regenerating a partial state model M13, and returns to step S131. The processing is performed on assumption that the procedure calculation is not completed for the new group generated in step S133.

Thereafter, these operations are repeated until there is no group for which invertibility has not been determined (step S134).

Figure 5:
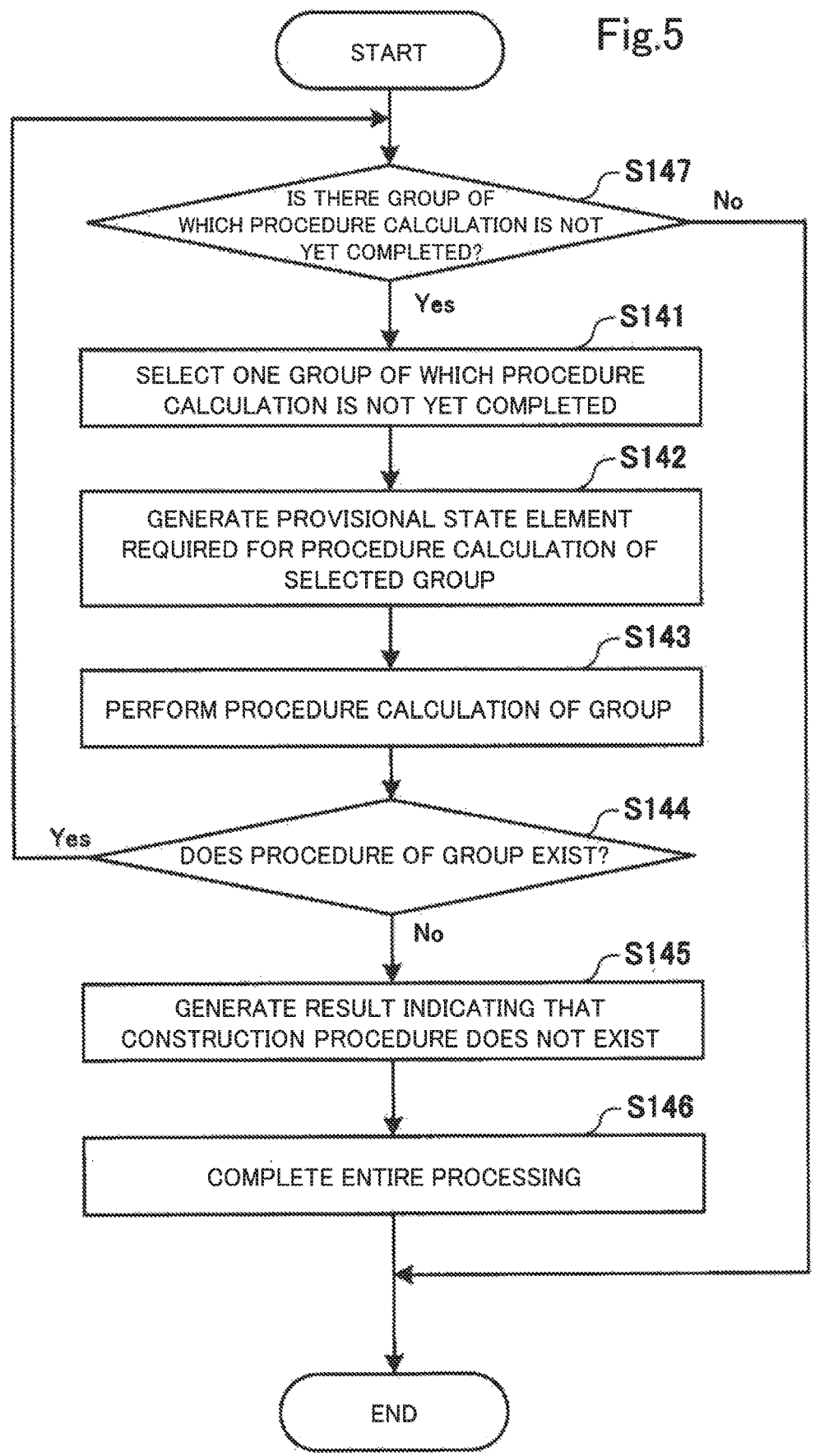
FIG. 5 is a flowchart showing an example of a more detailed processing flow of group dependent procedure calculation processing.

Next, the operation of step S14 in FIG. 2 will be described in detail with reference to FIG. 5. FIG. 5 is a flowchart showing an example of more detailed processing flow of group dependent procedure calculation processing shown as step S14 in FIG. 2. This group dependent procedure calculation processing can be basically similar to the calculation processing of the construction procedure of a system described in NPL 1. In other words, first, the group dependent procedure calculation unit 13 selects, from the groups obtained by dividing, any one group fulfilling a requirement that there is no other group including a state element depending on a state element included in the one group or that procedure calculation is completed for all the other groups each of which including a state element depending on a state element included in the one group (step S141). The group selected in step S141 is adopted as the group g.

Then, the group dependent procedure calculation unit 13 generates a provisional state element in which state transitions having dependency are put together for each of the other groups each including state elements each of which depends on a state element included in the group g (step S142).

Then, the group dependent procedure calculation unit 13 takes a set of the generated provisional state element and the state element included in the group g as a constraint on the procedure calculation and calculates a procedure in the group g (step S143). Here, the procedure calculation in a group can be performed by, for example, a technique of Automated Planning. The group dependent procedure calculation unit 13 may perform the procedure calculation using another technique that is not limited to the above-described. When the procedure calculation in step S143 is completed, the process returns to step S147. In the step S147, the group g is treated as a group for which procedure calculation is completed.

As a result of step S143, when it turns out that there is no effective procedure for the group g (No in step S144), the group dependent procedure calculation unit 13 generates a processing result indicating that there is no construction procedure for the required system state in the state model M12 (step S145), and step S15 in FIG. 2 is omitted and the whole processing is completed (step S146).

The group dependent procedure calculation unit 13 repeats the above operation until there is no group for which procedure calculation is not completed (step S147).

Next, the operation of step S15 in FIG. 2 will be described in more detail. The procedure integration processing shown as the operation of step S15 in FIG. 2 is basically similar to the integration processing of the system construction procedure described in NPL 1. That is, on the basis of a procedure of each of the groups found in step S14 and relation in order between the procedures of each of the groups, the procedural integration unit 14 integrates all procedures of the groups so that order relation in order between the procedures of the groups is not broken. With this operation, a construction procedure for the entire system is generated.

[Explanation about Effects]

As described above, the present example embodiment is configured to calculate, before performing procedure calculation, invertibility for each group of a partial state model generated by dividing a state model, and to redo division if necessary. This eventually enables division into groups in such a way that a state element included a group other than a group that is not invertible does not depend on a state element of the group that is not invertible. Therefore, it is possible to avoid erroneously determining that a construction procedure does not exist when a construction procedure of a system actually exists. That is, according to the present example embodiment, it is possible to properly generate a procedure even in the case where a procedure is not able to be generated properly by division into groups based on dependency between state elements.

Second Example Embodiment

Next, a second example embodiment of the present invention will be described with reference to the drawings. In the following description, the same reference signs are assigned to parts similar to those of the first example embodiment, description thereof will be omitted, and only parts that are different will be described.

[Explanation about Configuration]

Figure 6:
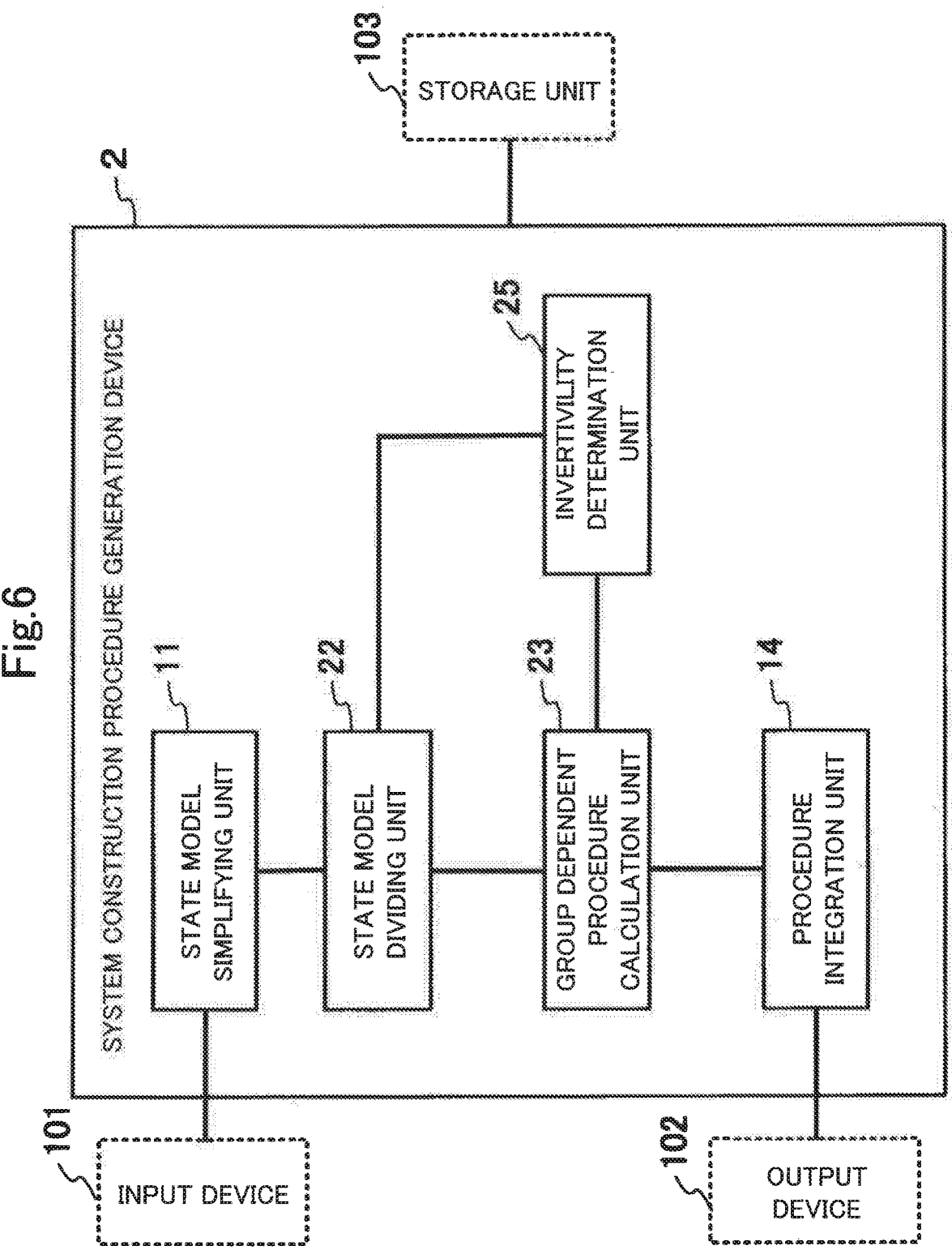
FIG. 6 is a block diagram showing a configuration example of a system construction procedure generation device according to a second example embodiment.

FIG. 6 is a block diagram showing a configuration example of a system construction procedure generation device according to the second example embodiment of the present invention. The system construction procedure generation device 2 shown in FIG. 6 includes a state model simplifying unit 11, a state model dividing unit 22, an invertibility determination unit 25, a group dependent procedure calculation unit 23, and a procedural integration unit 14.

Each of those units generally operates as follows.

In order to calculate a construction procedure of a system, the state model dividing unit 22 divides a state model into parts each of which is expected to be necessarily collectively used for consideration and calculation. Here, "parts each of which is expected to be necessarily collectively used for consideration and calculation" means groups in which state elements having dependency with circularity are in the same group. However, in the present example embodiment, the state model dividing unit 22 has a function of regrouping in response to an instruction from invertibility determination unit 25. More specifically, the state model dividing unit 22 has a function of integrating two or more groups that are specified into one group according to an instruction from the invertibility determination unit 25.

The invertibility determination unit 25 determines invertibility of a partial state model belonging to a specified group in groups of partial state models obtained as a result of division by the state model dividing unit 22. The invertibility determination unit 25 determines invertibility of, for example, the group specified by the group dependent procedure calculation unit 23. When the result of determination is that the specified group is not invertible and the specified group includes a provisional state element, the invertibility determination unit 25 requests the state model dividing unit 22 to regroup.

The group dependent procedure calculation unit 23 calculates a partial procedure in a system construction for each of the groups of the partial state models obtained as a result of the division by the state model dividing unit 22. The group dependent procedure calculation unit 23 according to the present example embodiment has a function of causing, when there exists a group for which a procedure does not exist as a result of calculating a construction procedure for each of the groups obtained by division, the invertibility determination unit 25 to determine invertibility for that group and to determine whether to perform revision of the groups.

[Explanation about Operation]

Figure 7:
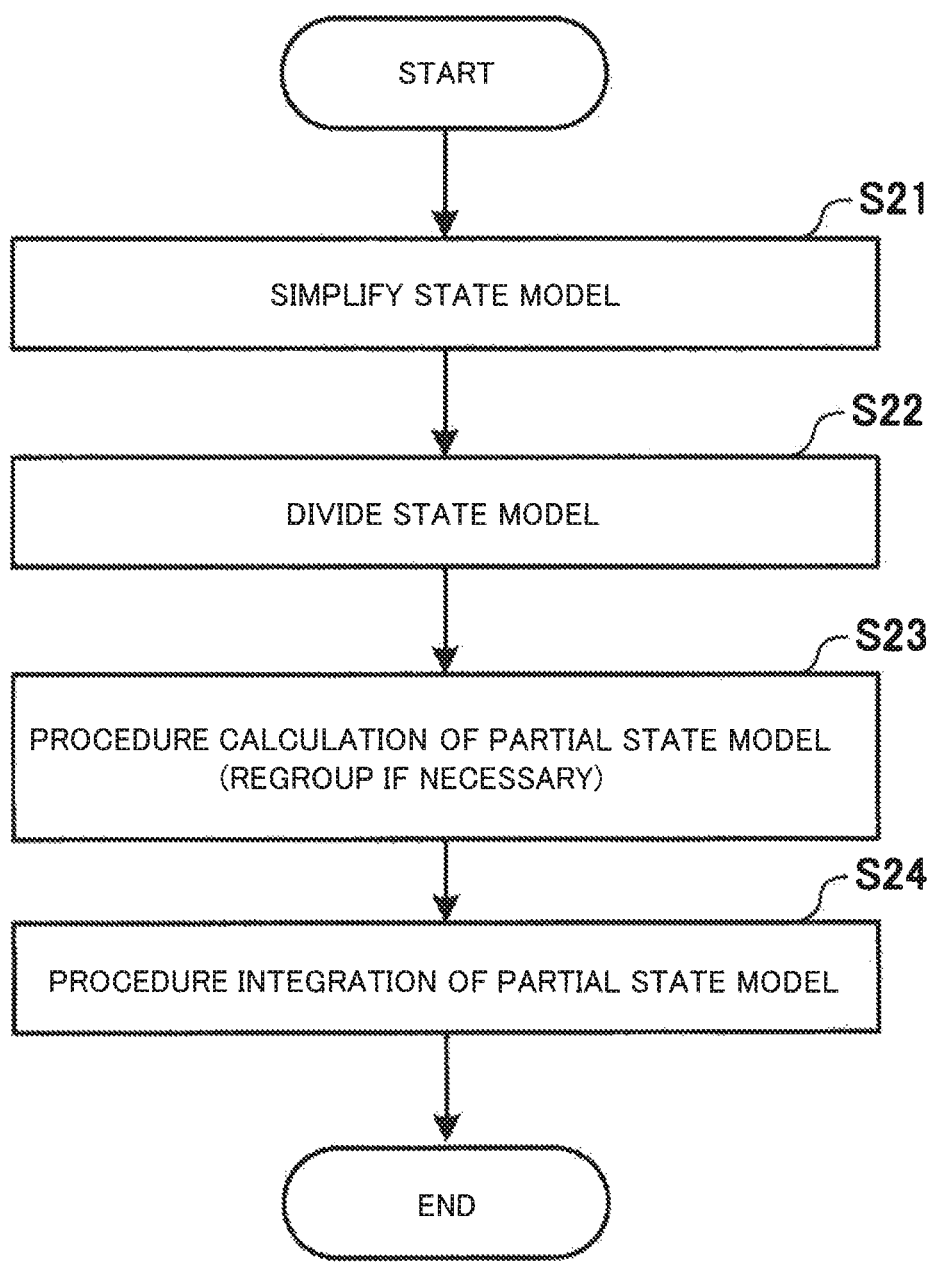
FIG. 7 is a flowchart showing an example of the overall operation of the system construction procedure generation device of the second example embodiment.

Next, the operation of the present example embodiment will be explained. FIG. 7 is a flowchart showing an example of an overall operation of a system construction procedure generation device according to the present example embodiment. In the example shown in FIG. 7, first, the state model simplifying unit 11 receives a state model of a target system as an input and removes an element which is expected to be unnecessary for construction from the received state model (step S21). The operation in step S21 may be similar to step S11 in the first example embodiment. Hereinafter, the state model received here may be referred to as a state model M21, and a simplified state model may be referred to as a state model M22. In a case where it does not matter whether a state model is simplified or not, it may be referred to as a state model M22 even if it is not simplified.

Next, the state model dividing unit 22 divides the state model M22 into groups each of which is expected to be necessarily collectively used for consideration and calculation (step S22). The operation in step S22 may be similar to step S12 in the first example embodiment. In step S22, one or more partial state models M23 are generated.

Then, the group dependent procedure calculation unit 23 calculates a partial procedure in the system construction for each of the groups generated by dividing by the state model dividing unit 22 (step S23).

Further, in step S23, the invertibility determination unit 25 performs invertibility determination as necessary, and the state model dividing unit 22 performs redoing division of the state model M22 (i.e. regrouping).

Finally, the procedure integration unit 14 integrates procedures, for each of the groups, calculated by the group dependent procedure calculation unit 23, and thereby generates a construction procedure for the entire system (step S24). The operation in step S24 may be similar to step S15 in the first example embodiment.

Figure 8:
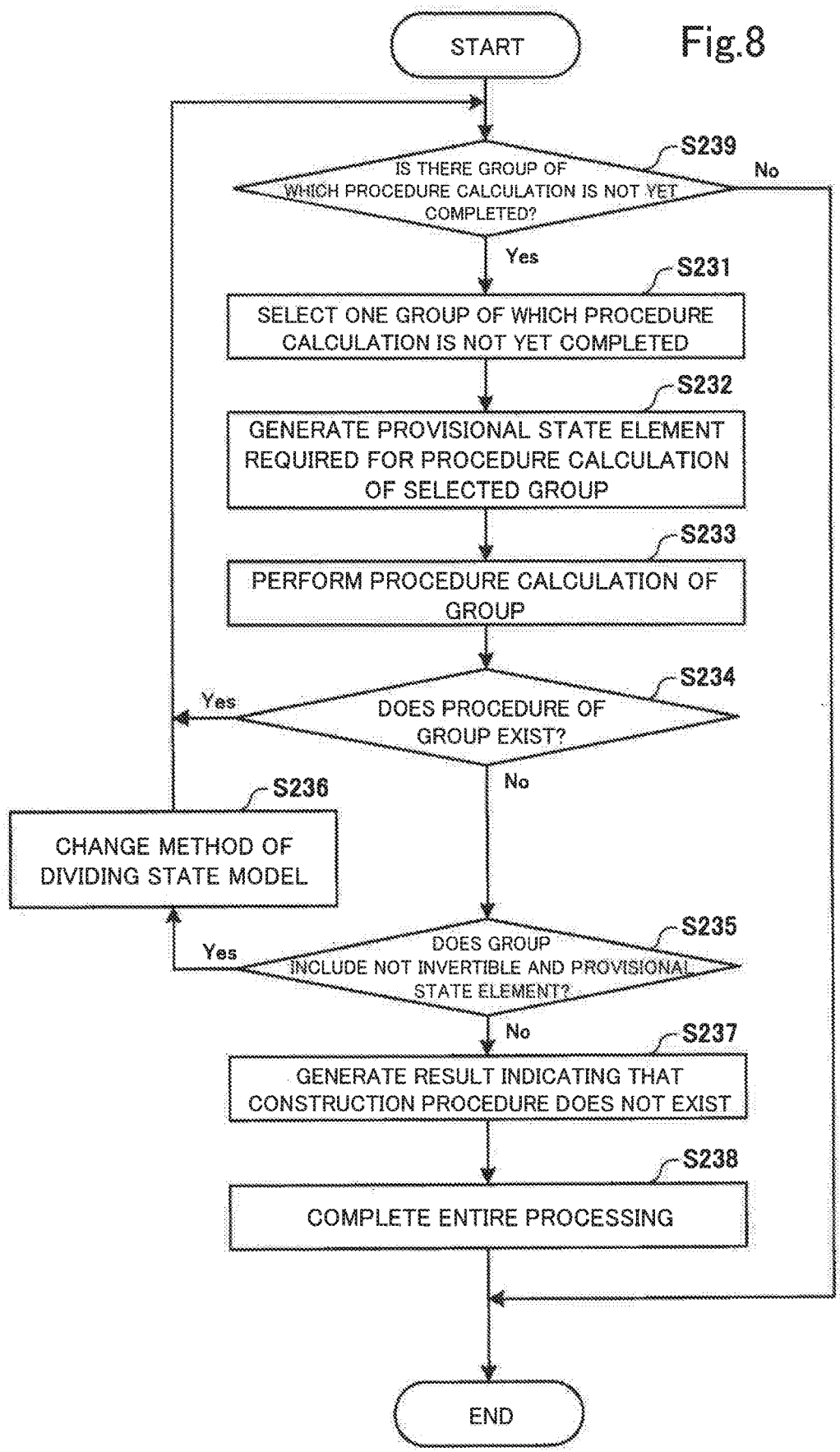
FIG. 8 is a flowchart showing an example of more detailed processing flow of group dependent procedure calculation processing of second example embodiment.

Next, the operation of step S23 in FIG. 7 will be explained in more detail with reference to FIG. 8. FIG. 8 is a flowchart showing an example of more detailed processing flow of group dependent procedure calculation processing (including regrouping processing) shown as step S23 in FIG. 7. In the example shown in FIG. 8, initially, the group dependent procedure calculation unit 23 selects any one group from groups, among groups which are obtained by division, for each of which no other group includes a state element depending on a state element in the concerning group or for each of which procedure calculation has been completed for all the other groups including a state element depending on a state element in the concerning group (step S231). The group selected in step S231 is referred to as a group g.

Then, for each of the other groups each of which includes a state element depending on a state element included in the group g, the group dependent procedure calculation unit 23 generates a provisional state element into which state transitions having dependency are integrated (step S232).

Then, the group dependent procedure calculation unit 23 takes a combination of the generated provisional state element and the state elements included in the group g as a constraint on the procedure calculation, and calculates a procedure in the group g (step S233).

The operations from step S231 to step S233 may be similar to the steps S141 to S143 of the first example embodiment shown in FIG. 5.

When the procedure calculation is completed in step S233, in step S231, the group g is considered as a group whose procedure calculation has been completed.

As a result of step S233, when no effective procedure proves to exist for the group g (No in step S234), the invertibility determination unit 25 determines invertibility of the group g (step S235). In step S235, the invertibility determination unit 25 checks not only invertibility but also whether the group g includes a provisional state element.

As a result of step S235, when group g is not invertible and includes a provisional state element (Yes in step S235), the state model dividing unit 22 changes the method of dividing the state model M22 (step S236). Here, the groups to be the change target are the group g and all the groups each of which includes a state element depending on a state element included in the group g. In response to, for example, a request from the invertibility determination unit 25, the state model dividing unit 22 generates, as a new group, a partial state model M23 into which all state elements included in the change target groups are integrated. After that, the process returns to step S239. In step S239, the group newly generated by group integration in step S236 is considered as a group for which procedure calculation has not been completed.

On the other hand, when the group g is invertible and when the group g does not include a provisional state element in step S235 (No in step S235), the invertibility determination unit 25 generates a processing result indicating that there is no construction procedure for transitioning the required system state for the state model M22 (Step S237), the step S24 in FIG. 7 is omitted, and the whole processing is finished (step S238).

The group dependent procedure calculation unit 23, the invertibility determination unit 25, and the state model dividing unit 22 repeat the above operation until a group for which procedure calculation is not completed is gone (step S239).

[Explanation about Effects]

The present example embodiment is configured to determine dependency and invertibility and to perform regrouping if necessary when there is a group for which a valid procedure is not able to be generated in the course of performing procedure calculation for each of the groups of partial state models into which a state model is divided. For this reason, even when the first processing of dividing a state model generates a group configuration in which a group that is not invertible includes a state element on which a state element of another group depends, and, as a result of procedure calculation of the concerning another group, a procedure of the group on which it depend is determined to be not able to be generated, regrouping is able to prevent such erroneous determination. That is, according to the present example embodiment, it is possible to generate a procedure properly even in a case where a procedure is not able be generated properly by simple group division based on dependency.

In the example shown in each of the above example embodiments, the unit (i.e. the state model dividing unit 12 or the state model dividing unit 22) of dividing a state model and the unit of regrouping groups generated by division are identical, but they may be separate units.

Figure 9:
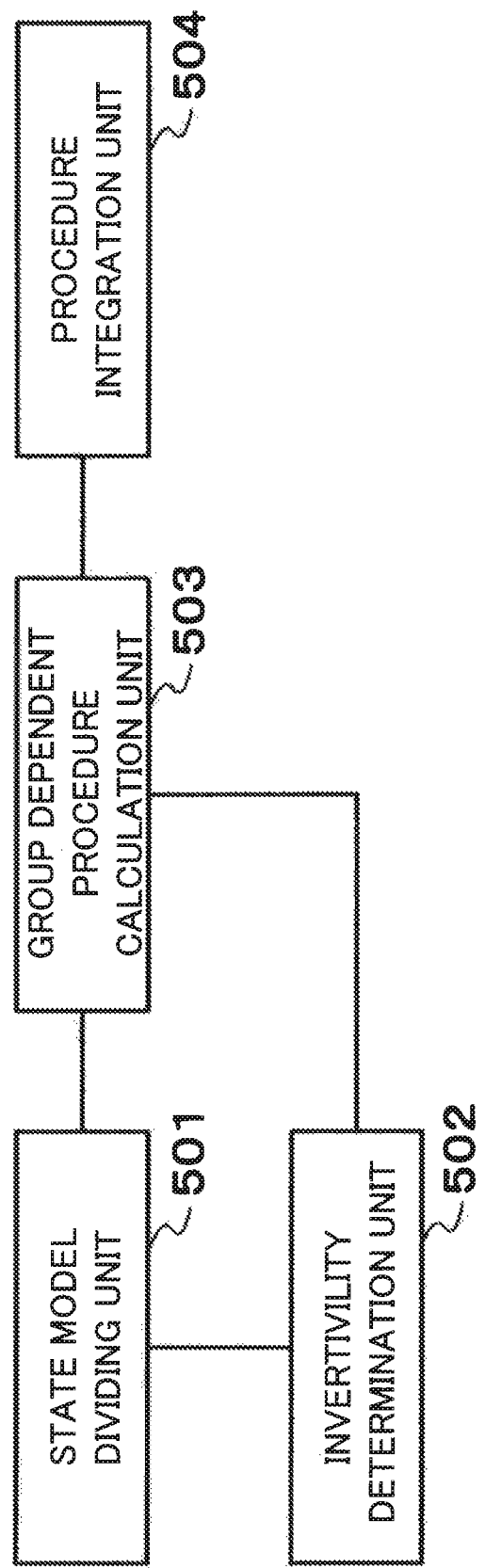
FIG. 9 is a block diagram showing an outline of the present invention.

Next, overview of the present invention will be explained. FIG. 9 is a block diagram showing overview of the present invention. The system construction procedure support system shown in FIG. 9 includes a state model dividing unit 501, an invertibility determination unit 502, a group dependent procedure calculation unit 503, and a procedure integration unit 504.

The state model dividing unit 501 (e.g., state model dividing unit 12, and state model dividing unit 22) divides a state model into one or more groups on the basis of at least dependency between state elements included in the state model.

The invertibility determination unit 502 (e.g., the invertibility determination unit 15, and the invertibility determination unit 25) determines invertibility of state elements belonging to a specified group.

The group dependent procedure calculation unit 503 (e.g., the group dependent procedure calculation unit 13, and the group dependent procedure calculation unit 23) calculates a procedure for causing the state elements belonging to a concerning group to transit to a required state for each of the groups generated by dividing.

The procedure integration unit 504 (e.g., the procedure integration unit 14) integrates the procedure calculated for each of the groups.

Here, the state model dividing unit 501 may divide the state model into one or more groups on the basis of dependency between the state elements and invertibility of the state elements belonging to the groups generated by dividing.

In addition, the state model dividing unit 501 may regroup the groups on the basis of a result of procedure calculation and a result of determining the invertibility for each of the groups.

When there is a group for which a valid procedure is not calculated and which is determined to be not invertible, the state model dividing unit 501 may regroup the group and a group including a state element having the dependency on any of the state elements belonging to the group into one group.

With such a configuration, it is possible to avoid the problem that a procedure is incorrectly determined not to exist even though the procedure actually exists and that is not able to be prevented by simply dividing a state model on the basis of dependency between state elements. Therefore, a construction procedure of a system can be generated more reliably while suppressing the calculation amount.

Figure 10:
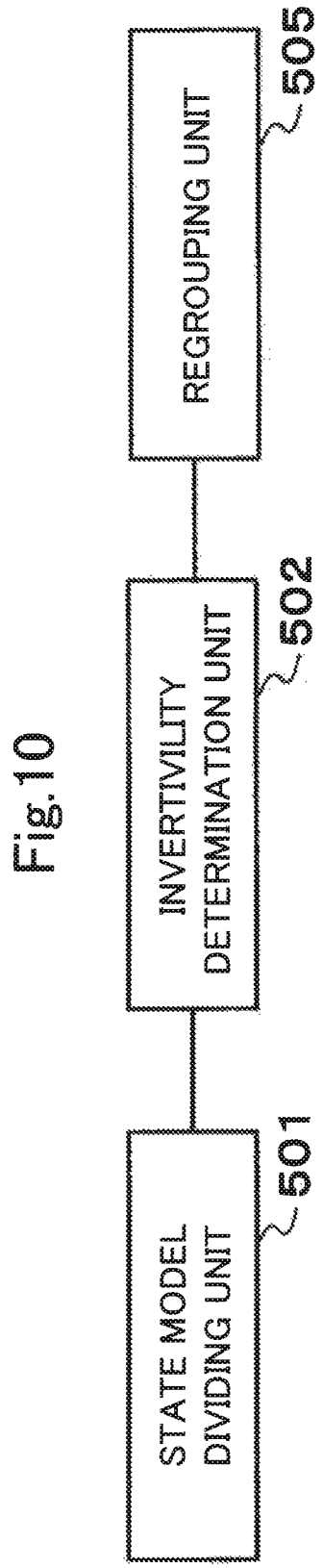
FIG. 10 is a block diagram showing another configuration example of an information processing device according to the present invention.
Figure 11:
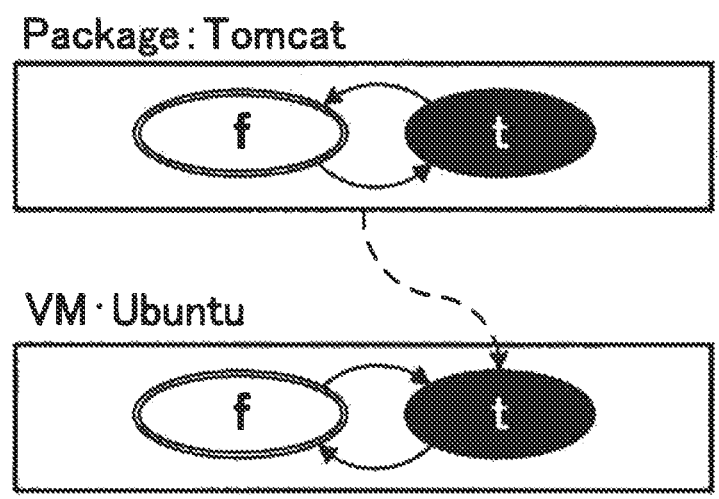
FIG. 11 is an explanatory view showing an example of a state model.
Figure 12:
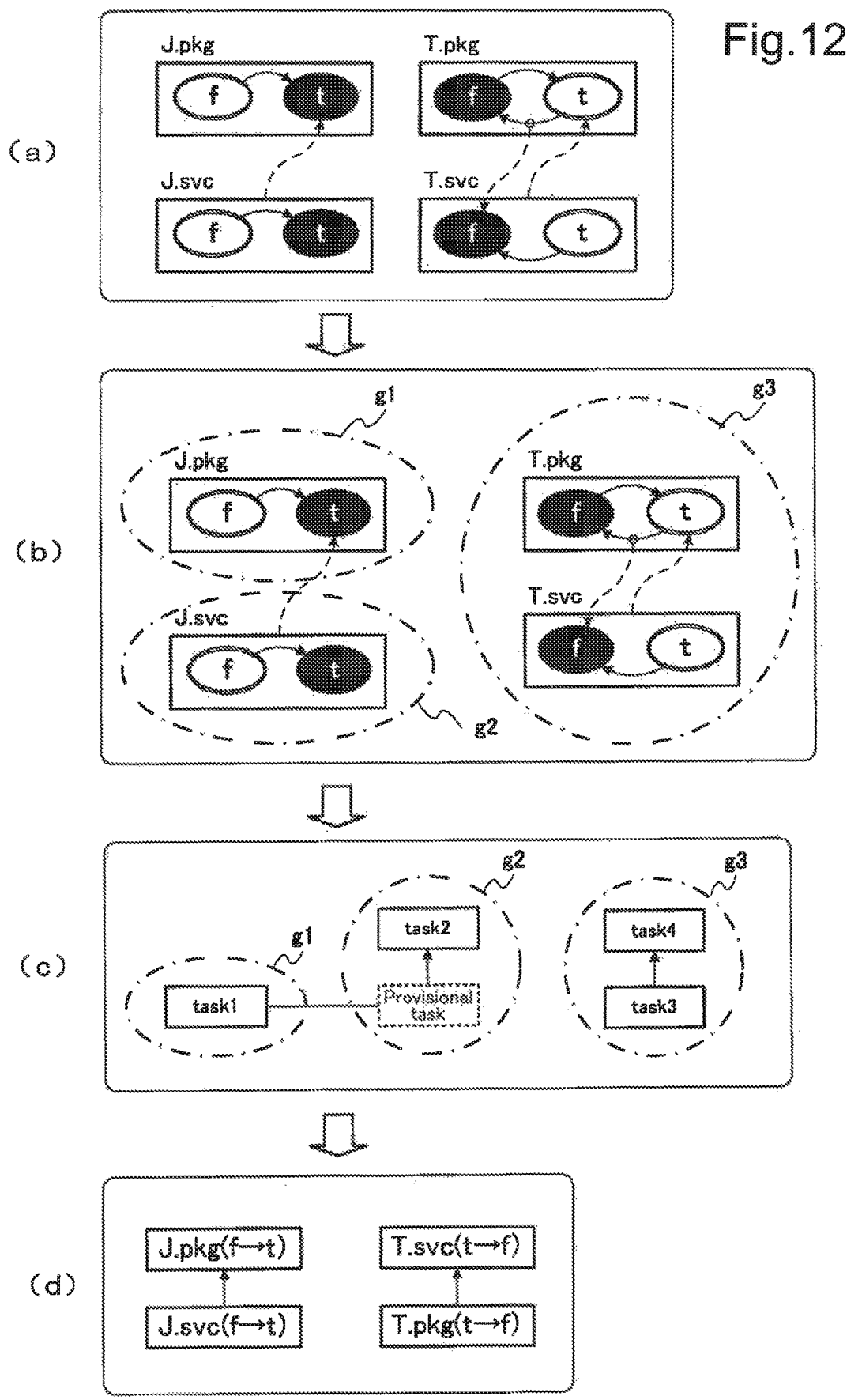
FIG. 12 is an explanatory diagram showing a division example of the state model.
Figure 13:
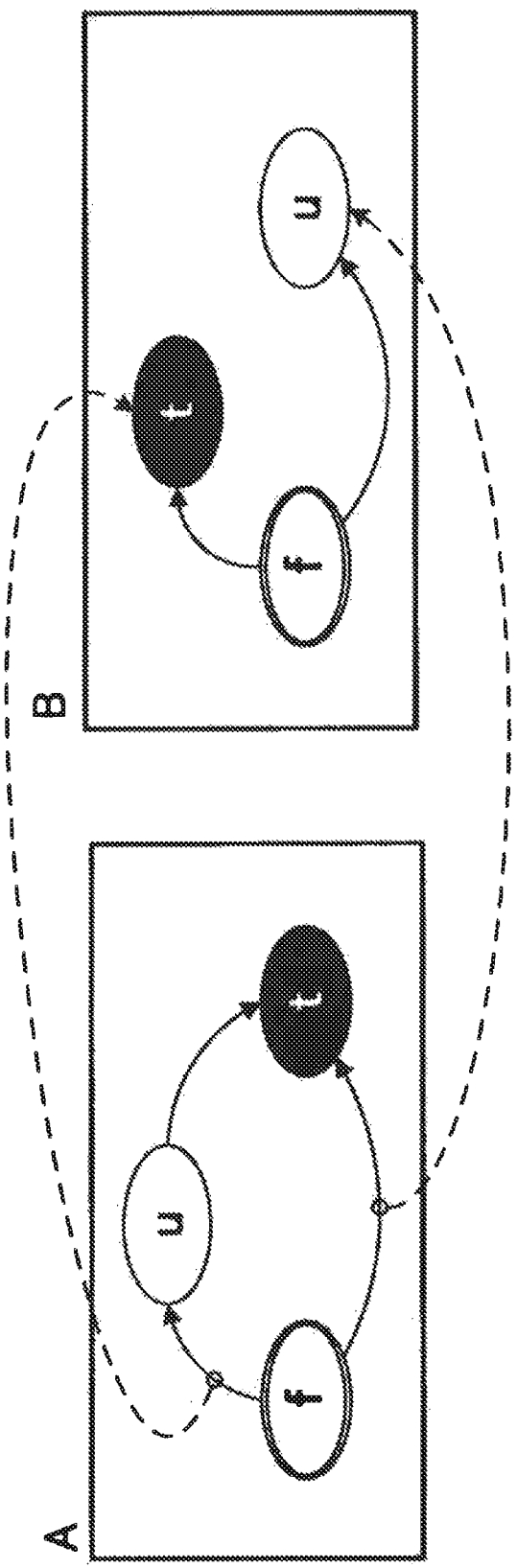
FIG. 13 is an explanatory view showing another example of the state model.

FIG. 10 is a block diagram showing another configuration example of the information processing device according to the present invention. As shown in FIG. 10, the another configuration example of the information processing device according to the present invention may include a state model dividing unit 501, an invertibility determination unit 502, and a regrouping unit 505.

In the configuration shown in FIG. 10, the state model dividing unit 501 divides a state model into one or more groups on the basis of at least dependency between state elements included in the state model. The invertibility determination unit 502 determines invertibility of the state elements belonging to a specified group. The regrouping unit 505 regroups the groups on the basis of a result of determining the invertibility.

Also with such a configuration, the same problem can be avoided. Therefore, a construction procedure of a system can be generated more reliably while suppressing the calculation amount.

<Other Modes>

As described above, a system construction procedure generation device according to an example embodiment of the present invention may be a computer such as a personal computer or a server device. Specifically, the system construction procedure generation device according to an example aspect of the present invention can be achieved by a computer including a memory in which a program read out from a storage medium is loaded and a processor executing the program. The system construction procedure generation device according to an example embodiment of the present invention can also be achieved by dedicated hardware. The system construction procedure generation device according to an example embodiment of the present invention can also be achieved by a combination of the computer described above and dedicated hardware.

Similarly, the information processing device described above can be achieved by a computer including a memory in which a program read out from a storage medium is loaded and a processor executing the program. The information processing device described above can also be achieved by dedicated hardware. The information processing device described above can also be achieved by a combination of the above-described computer and dedicated hardware.

Figure 16:
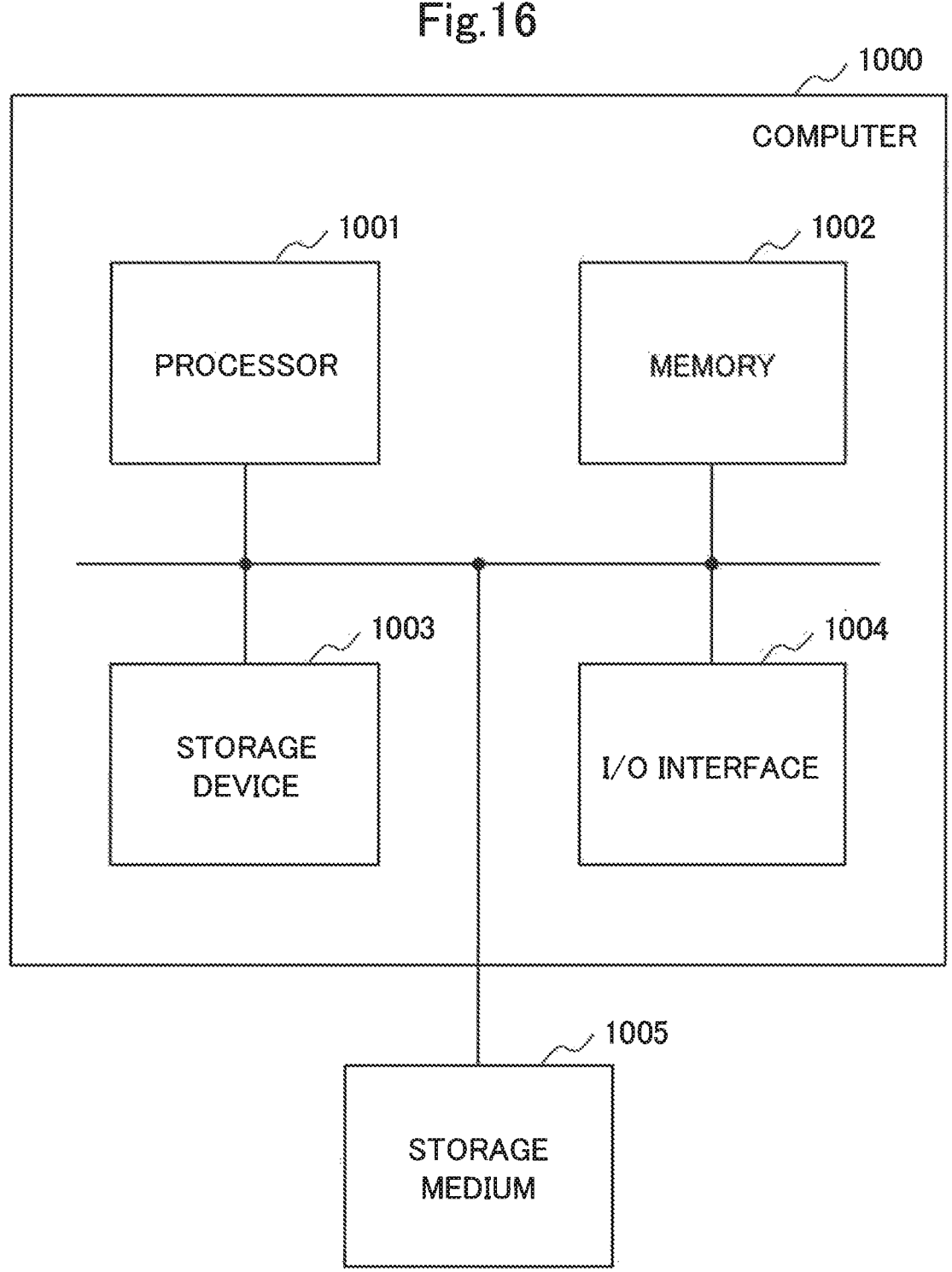
FIG. 16 is a block diagram showing a configuration example of a computer by which a system construction procedure generation device and an information processing device according to an example embodiment of the present invention can be achieved.

FIG. 16 is a block diagram showing an example of a configuration of a computer 1000 by which a system construction procedure generation device and an information processing device according to an example embodiment of the present invention can be achieved. Referring to FIG. 16, the computer 1000 includes a processor 1001, a memory 1002, a storage device 1003, and an I/O (Input/Output) interface 1004. In addition, the computer 1000 can access the storage medium 1005. The memory 1002 and the storage device 1003 are storage devices such as a Random Access Memory (RAM) or a hard disk, for example. The storage medium 1005 is, for example, a RAM, a storage device such as a hard disk, a Read Only Memory (ROM), or a portable storage medium. The storage device 1003 may be the storage medium 1005. The processor 1001 can read/write data and a program from/into the memory 1002 and the storage device 1003. The processor 1001 can access the input device 101, the output device 102, the storage unit 103, and the like, for example, via the I/O interface 1004. The processor 1001 can access the storage medium 1005.

The storage medium 1005 stores a program that causes the computer 1000 to operate as the system construction procedure generation device 1. In other words, the storage medium 1005 stores, for example, a program achieving functions of the state model simplifying unit 11, the state model dividing unit 12, the group dependent procedure calculation unit 13, the procedure integration unit 14, and the invertibility determination unit 15.

The processor 1001 loads the program stored in the storage medium 1005 into the memory 1002. Then, the processor 1001 executes the program loaded in the memory 1002. Then, the computer 1000 operates as the system construction procedure generation device 1. That is, each of the state model simplifying unit 11, the state model dividing unit 12, the group dependent procedure calculation unit 13, the procedural integration unit 14, and the invertibility determination unit 15 can be achieved by the memory 1002 in which the program described above and the processor 1001 executing the program.

Each of the state model simplifying unit 11, the state model dividing unit 12, the group dependent procedure calculation unit 13, the procedure integration unit 14, and the invertibility determination unit 15 can also be achieved by a dedicated circuit. Each of the state model simplifying unit 11, the state model dividing unit 12, the group dependent procedure calculation unit 13, the procedural integration unit 14, and the invertibility determination unit 15 can also be achieved by a combination of the above-described memory 1002 and processor 1001 and a dedicated circuit.

The storage medium 1005 may store a program that causes the computer 1000 to operate as the system construction procedure generation device 2. In other words, the storage medium 1005 may store, for example, a program achieving the functions of the state model simplifying unit 11, the state model dividing unit 22, the group dependent procedure calculation unit 23, the procedure integration unit 14, and the invertibility determination unit 25.

The processor 1001 loads the program stored in the storage medium 1005 into the memory 1002. Then, the processor 1001 executes the program loaded into the memory 1002. Then, the computer 1000 operates as the system construction procedure generation device 2. That is, the state model dividing unit 22, the group dependent procedure calculation unit 23, and the invertibility determination unit 25 can be achieved by the memory 1002 into which the program described above is loaded and the processor 1001 executing the program.

Each of the state model dividing unit 22, the group dependent procedure calculation unit 23, and the invertibility determination unit 25 can also be achieved by a dedicated circuit. The state model dividing unit 22, the group dependent procedure calculation unit 23, and the invertibility determination unit 25 can also be achieved by a combination of the above-described memory 1002 and processor 1001 and a dedicated circuit.

The storage medium 1005 may store a program that causes the computer 1000 to operate as the system construction procedure generation device shown in FIG. 9. In other words, the storage medium 1005 may store, for example, a program achieving the functions of the state model dividing unit 501, the invertibility determination unit 502, the group dependent procedure calculation unit 503, and the procedure integration unit 504.

The processor 1001 loads the program stored in the storage medium 1005 into the memory 1002. Then, the processor 1001 executes the program loaded into the memory 1002. Then, the computer 1000 operates as the system construction procedure generation device shown in FIG. 9. Each of the state model dividing unit 501, the invertibility determination unit 502, the group dependent procedure calculation unit 503, and the procedure integration unit 504 can be achieved by the memory 1002 into which the program described above is loaded and the processor 1001 executing the program.

Each of the state model dividing unit 501, the invertibility determination unit 502, the group dependent procedure calculation unit 503, and the procedure integration unit 504 can also be achieved by a dedicated circuit. Each of the state model dividing unit 501, the invertibility determination unit 502, the group dependent procedure calculation unit 503, and the procedure integration unit 504 can also be achieved by a combination of the above-described memory 1002 and processor 1001 and a dedicated circuit.

The storage medium 1005 may store a program that causes the computer 1000 to operate as the information processing device shown in FIG. 10. In other words, the storage medium 1005 may store, for example, a program achieving the functions of the state model dividing unit 501, the invertibility determination unit 502, and the regrouping unit 505.

The processor 1001 loads the program stored in the storage medium 1005 into the memory 1002. Then, the processor 1001 executes the program loaded into the memory 1002. Then, the computer 1000 operates as the information processing device shown in FIG. 10. In addition to the state model dividing unit 501 and the invertibility determination unit 502, the regrouping unit 505 can be achieved by the memory 1002 into which the program described above is loaded and the processor 1001 executing the program.

The regrouping unit 505 can also be achieved by a dedicated circuit. The regrouping unit 505 can also be achieved by a combination of the above-described memory 1002 and processor 1001 and a dedicated circuit.

Although the present invention has been described with reference to the present example embodiment and examples, the present invention is not limited to the above example embodiments and examples. In the configuration and details of the present invention, various changes that can be understood by those skilled in the art within the scope of the present invention can be made.

INDUSTRIAL APPLICABILITY

The present invention can be suitably applied to not only the Internet Technology (IT) system, but also design support for constructing a system including a plurality of components.

REFERENCE SIGNS LIST 1, 2 system construction procedure generation device
11 state model simplifying unit
12, 22 state model dividing unit
13, 23 group dependent procedure calculation unit
14 procedure integration unit
15, 25 invertibility determination unit
101 input device
102 output device
103 storage unit
501 state model dividing unit
502 invertibility determination unit
503 group dependent procedure calculation unit
504 procedure integration unit
505 regrouping unit
1000 computer
1001 processor
1002 memory
1003 storage device
1004 I/O interface
1005 storage medium

The invention claimed is:

1. A system construction assistance system comprising:
a memory that stores a set of instructions; and
at least one processor configured to execute the set of instructions to:
divide a state model into one or more groups based on at least dependency between state elements included in the state model, the state model representing a system, each of the state elements representing a component of the system and being capable of taking a plurality of states and being capable of transitioning between the plurality of states;
determine invertibility of state elements belonging to a specified group, the invertibility being a capability of the state elements to transition from any one of the plurality of states to any other of the plurality of states in the specified group;
calculate, separately for each of the groups generated by dividing, a procedure for causing the state elements belonging to the respective group to transition to a required state; and
integrate the procedure calculated for each of the groups.

2. The system construction assistance system according to claim 1, wherein the at least one processor is configured to divide the state model into the one or more groups based on the dependency between the state elements and the invertibility of the state elements belonging to the groups generated by dividing.

3. The system construction assistance system according to claim 1, wherein
the at least one processor is configured to
regroup the groups based on a result of calculating the procedure and a result of determining the invertibility for each of the groups.

4. The system construction assistance system according to claim 3, wherein
the at least one processor is configured to regroup, when there is a group for which a valid procedure is not calculated and which is determined to be not invertible, the group and a group including a state element having the dependency on any of the state elements belonging to the group into one group.

5. An information processing device comprising:
a memory that stores a set of instructions; and
at least one processor configured to execute the set of instructions to:
divide a state model into one or more groups based on at least dependency between state elements included in a state model, the state model representing a system, each of the state elements representing a component of the system and being capable of taking a plurality of states and being capable of transitioning between the plurality of states;
determine invertibility of state elements belonging to a specified group, the invertibility being a capability of the state elements to transition from any one of the plurality of states to any other of the plurality of states in the specified group; and
regroup the groups based on a result of determining the invertibility.

6. A non-transitory computer readable storage medium storing a system construction support program for causing a computer to execute:
state model division processing of dividing a state model into one or more groups based on at least dependency between state elements included in the state model, the state model representing a system, each of the state elements representing a component of the system and being capable of taking a plurality of states and being capable of transitioning between the plurality of states;
invertibility determination processing of determining invertibility of state elements belonging to a specified group, the invertibility being a capability of the state elements to transition from any one of the plurality of states to any other of the plurality of states in the specified group;

group dependent procedure calculation processing of calculating, separately for each of the groups generated by dividing, a procedure for causing the state elements belonging to a group to a required state; and procedure integration processing of integrating the procedure calculated for each of the groups.

7. A non-transitory computer readable storage medium storing a system construction support program for causing a computer to execute:

state model division processing of dividing the state model into one or more groups based on at least dependency between state elements included in the state model, the state model representing a system, each of the state elements representing a component of the system and being capable of taking a plurality of states and being capable of transitioning between the plurality of states;

invertibility determination processing of determining invertibility of state elements belonging to a specified group, the invertibility being a capability of the state elements to transition from any one of the plurality of states to any other of the plurality of states in the specified group; and regroup processing of regrouping the groups based on a result of determining the invertibility.

8. A system construction support method comprising:

dividing a state model into one or more groups based on at least dependency between state elements included in the state model, the state model representing a system, each of the state elements representing a component of the system and being capable of taking a plurality of states and being capable of transitioning between the plurality of states;

determining invertibility of state elements belonging to a specified group, the invertibility being a capability of the state elements to transition from any one of the plurality of states to any other of the plurality of states in the specified group;

calculating, separately for each of the groups generated by dividing, a procedure for causing the state elements belonging to a group to transition to a required state; and integrating the procedure calculated for each of the groups.

9. The system construction support method according to claim 8, wherein the dividing includes dividing the state model into the one or more groups based of the dependency between the state elements and invertibility of the state elements belonging to the groups generated by the dividing.

10. The system construction support method according to claim 8, comprising regrouping the groups based on a result of calculating the procedure for each of the groups and a result of determining the invertibility.

11. The system construction support method according to claim 10, wherein the regrouping includes regrouping, when there is a group for which a valid procedure is not calculated and which is determined to be not invertible, the group and a group including a state element having the dependency on any of the state elements belonging to the group into one group.

12. An information processing method comprising:

dividing a state model into one or more groups based on at least dependency between state elements included in the state model, the state model representing a system, each of the state elements representing a component of the system and being capable of taking a plurality of states and being capable of transitioning between the plurality of states;

determining invertibility of state elements belonging to a specified group, the invertibility being a capability of the state elements to transition from any one of the plurality of states to any other of the plurality of states in the specified group; and regrouping the groups based on a result of determining the invertibility.

* * * * *